United States Patent
Singh et al.

(10) Patent No.: US 12,408,139 B2
(45) Date of Patent: Sep. 2, 2025

(54) DETECTING HIGH PRIORITY PAGING MESSAGES FOR A USER EQUIPMENT WITH MULTIPLE SUBSCRIPTIONS

(71) Applicant: QUALCOMM Incorporated, San Diego, CA (US)

(72) Inventors: Ravneet Singh, Hyderabad (IN); Mayank Arora, Hyderabad (IN); Rajat Aggarwal, Telangana (IN); Amar Kumar Nandan, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 347 days.

(21) Appl. No.: 17/907,380

(22) PCT Filed: May 11, 2021

(86) PCT No.: PCT/US2021/031773
§ 371 (c)(1),
(2) Date: Sep. 26, 2022

(87) PCT Pub. No.: WO2021/236377
PCT Pub. Date: Nov. 25, 2021

(65) Prior Publication Data
US 2023/0118310 A1   Apr. 20, 2023

(30) Foreign Application Priority Data
May 22, 2020   (IN) .............................. 202041021596

(51) Int. Cl.
*H04W 68/00*       (2009.01)
*H04W 60/00*       (2009.01)
(Continued)

(52) U.S. Cl.
CPC ......... *H04W 68/00* (2013.01); *H04W 60/005* (2013.01); *H04W 76/10* (2018.02); *H04W 76/20* (2018.02)

(58) Field of Classification Search
CPC ... H04W 68/00; H04W 60/005; H04W 76/10; H04W 76/20; H04W 8/26; H04W 76/27; H04W 8/183
See application file for complete search history.

(56) References Cited

U.S. PATENT DOCUMENTS

2017/0180951 A1* 6/2017 Lee .................... H04W 72/543
2018/0132186 A1* 5/2018 Kumar ............. H04W 52/0261
(Continued)

FOREIGN PATENT DOCUMENTS

CN   110012545 A   7/2019
EP   2878162 A1    6/2015
(Continued)

OTHER PUBLICATIONS

Intel Corporation: "Motivation for RAN Level Multi-Sim Support", 3GPP Draft, 3GPP TSG RAN #84, RP-191347, RAN Multi-Sim Intel, 3rd Generation Partnership Project (3GPP), Mobile Competence Centre, 650, Route Des Lucioles, F-06921 Sophia-Antipolis Cedex, France, vol. TSG RAN, No. Newport Beach, USA, Jun. 3, 2019-Jun. 6, 2019, Jun. 2, 2019 (Jun. 2, 2019), XP051747954, 7 Pages, pp. 5.6.
(Continued)

*Primary Examiner* — Christopher M Brandt
(74) *Attorney, Agent, or Firm* — Harrity & Harrity, LLP

(57) ABSTRACT

Various aspects of the present disclosure generally relate to wireless communication. In some aspects, a user equipment (UE) may receive, in association with a first subscription of the UE, an indication of a high priority identifier to be used for paging messages associated with the first subscription.

(Continued)

The high priority identifier may be associated with a same set of paging occasions as a second identifier allocated to the UE for paging. The UE may tune away from a network connection associated with a second subscription of the UE and monitor one or more paging occasions associated with the high priority identifier and the second identifier based at least in part on tuning away. Accordingly, the UE may determine, using the high priority identifier, whether a high priority paging message is present for the UE based at least in part on the monitoring. Numerous other aspects are provided.

30 Claims, 7 Drawing Sheets

(51) Int. Cl.
*H04W 76/10* (2018.01)
*H04W 76/20* (2018.01)

(56) References Cited

U.S. PATENT DOCUMENTS

| | | | |
|---|---|---|---|
| 2018/0160422 A1* | 6/2018 | Pathak | H04W 76/10 |
| 2021/0105866 A1* | 4/2021 | Kavuri | H04W 76/27 |
| 2021/0227376 A1* | 7/2021 | Jha | H04W 8/183 |

FOREIGN PATENT DOCUMENTS

| | | |
|---|---|---|
| EP | 2878162 B1 | 6/2016 |
| WO | 2011109750 | 9/2011 |
| WO | 2016164149 A1 | 10/2016 |

OTHER PUBLICATIONS

International Search Report and Written Opinion—PCT/US2021/031773—ISA/EPO—Sep. 3, 2021.
Taiwan Search Report—TW110117135—TIPO—Sep. 9, 2024.

* cited by examiner

DETECTING HIGH PRIORITY PAGING MESSAGES FOR A USER EQUIPMENT WITH MULTIPLE SUBSCRIPTIONS

CROSS-REFERENCE TO RELATED APPLICATIONS

This Patent Application is a 371 national stage of PCT Application No. PCT/US2021/031773 filed on May 11, 2011, entitled "DETECTING HIGH PRIORITY PAGING MESSAGES FOR A USER EQUIPMENT WITH MULTIPLE SUBSCRIPTIONS," which claims priority to Indian Provisional Patent Application No. 202041021596, filed on May 22, 2020, entitled "DETECTING HIGH PRIORITY PAGING MESSAGES FOR A USER EQUIPMENT WITH MULTIPLE SUBSCRIPTIONS." The disclosure of the prior Applications are considered part of and are hereby expressly incorporated by reference in this Patent Application.

FIELD OF THE DISCLOSURE

Aspects of the present disclosure generally relate to wireless communication and to techniques and apparatuses for detecting high priority paging messages for a user equipment with multiple subscriptions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), includes receiving, in association with a first subscription of the UE, an indication of a high priority identifier to be used for paging messages associated with the first subscription, wherein the high priority identifier is associated with a same set of paging occasions as a second identifier allocated to the UE for paging; tuning away from a network connection associated with a second subscription of the UE; monitoring one or more paging occasions associated with the high priority identifier and the second identifier based at least in part on tuning away from the network connection associated with the second subscription; and determining, using the high priority identifier, whether a high priority paging message is present for the UE based at least in part on monitoring the one or more paging occasions.

In some aspects, a method of wireless communication, performed by a network node, includes transmitting, in association with a first subscription of a UE, an indication of a high priority identifier to be used for paging messages associated with the first subscription, wherein the high priority identifier is associated with a same set of paging occasions as a second identifier allocated to the UE for paging; and transmitting, in one or more paging occasions associated with the high priority identifier and the second identifier, an indication of whether a high priority paging message is present for the UE, wherein the indication is based at least in part on the high priority identifier.

In some aspects, a UE for wireless communication includes a memory and one or more processors coupled to the memory. The memory and the one or more processors are configured to receive, in association with a first subscription of the UE, an indication of a high priority identifier to be used for paging messages associated with the first subscription, wherein the high priority identifier is associated with a same set of paging occasions as a second identifier allocated to the UE for paging; tune away from a network connection associated with a second subscription of the UE; monitor one or more paging occasions associated with the high priority identifier and the second identifier based at least in part on tuning away from the network connection associated with the second subscription; and determine, using the high priority identifier, whether a high priority paging message is present for the UE based at least in part on monitoring the one or more paging occasions.

In some aspects, a network node for wireless communication includes a memory and one or more processors coupled to the memory. The memory and the one or more processors are configured to transmit, in association with a first subscription of a UE, an indication of a high priority identifier to be used for paging messages associated with the first subscription, wherein the high priority identifier is associated with a same set of paging occasions as a second identifier allocated to the UE for paging; and transmit, in one or more paging occasions associated with the high priority identifier and the second identifier, an indication of whether a high priority paging message is present for the UE, wherein the indication is based at least in part on the high priority identifier.

In some aspects, a non-transitory computer-readable medium storing a set of instructions for wireless communication includes one or more instructions that, when executed by one or more processors of a UE, cause the UE to receive, in association with a first subscription of the UE, an indication of a high priority identifier to be used for paging messages associated with the first subscription, wherein the high priority identifier is associated with a same set of paging occasions as a second identifier allocated to the UE for paging; tune away from a network connection associated with a second subscription of the UE; monitor one or more paging occasions associated with the high priority identifier and the second identifier based at least in part on tuning away from the network connection associated with the second subscription; and determine, using the high priority identifier, whether a high priority paging message is present for the UE based at least in part on monitoring the one or more paging occasions.

In some aspects, a non-transitory computer-readable medium storing a set of instructions for wireless communication includes one or more instructions that, when executed by one or more processors of a network node, cause the network node to transmit, in association with a first subscription of a UE, an indication of a high priority identifier to be used for paging messages associated with the first subscription, wherein the high priority identifier is associated with a same set of paging occasions as a second identifier allocated to the UE for paging; and transmit, in one or more paging occasions associated with the high priority identifier and the second identifier, an indication of whether a high priority paging message is present for the UE, wherein the indication is based at least in part on the high priority identifier.

In some aspects, an apparatus for wireless communication includes means for receiving, in association with a first subscription of the apparatus, an indication of a high priority identifier to be used for paging messages associated with the first subscription, wherein the high priority identifier is associated with a same set of paging occasions as a second identifier allocated to the apparatus for paging; means for tuning away from a network connection associated with a second subscription of the apparatus; means for monitoring one or more paging occasions associated with the high priority identifier and the second identifier based at least in part on tuning away from the network connection associated with the second subscription; and means for determining, using the high priority identifier, whether a high priority paging message is present for the apparatus based at least in part on monitoring the one or more paging occasions.

In some aspects, an apparatus for wireless communication includes means for transmitting, in association with a first subscription of a UE, an indication of a high priority identifier to be used for paging messages associated with the first subscription, wherein the high priority identifier is associated with a same set of paging occasions as a second identifier allocated to the UE for paging; and transmitting, in one or more paging occasions associated with the high priority identifier and the second identifier, an indication of whether a high priority paging message is present for the UE, wherein the indication is based at least in part on the high priority identifier.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
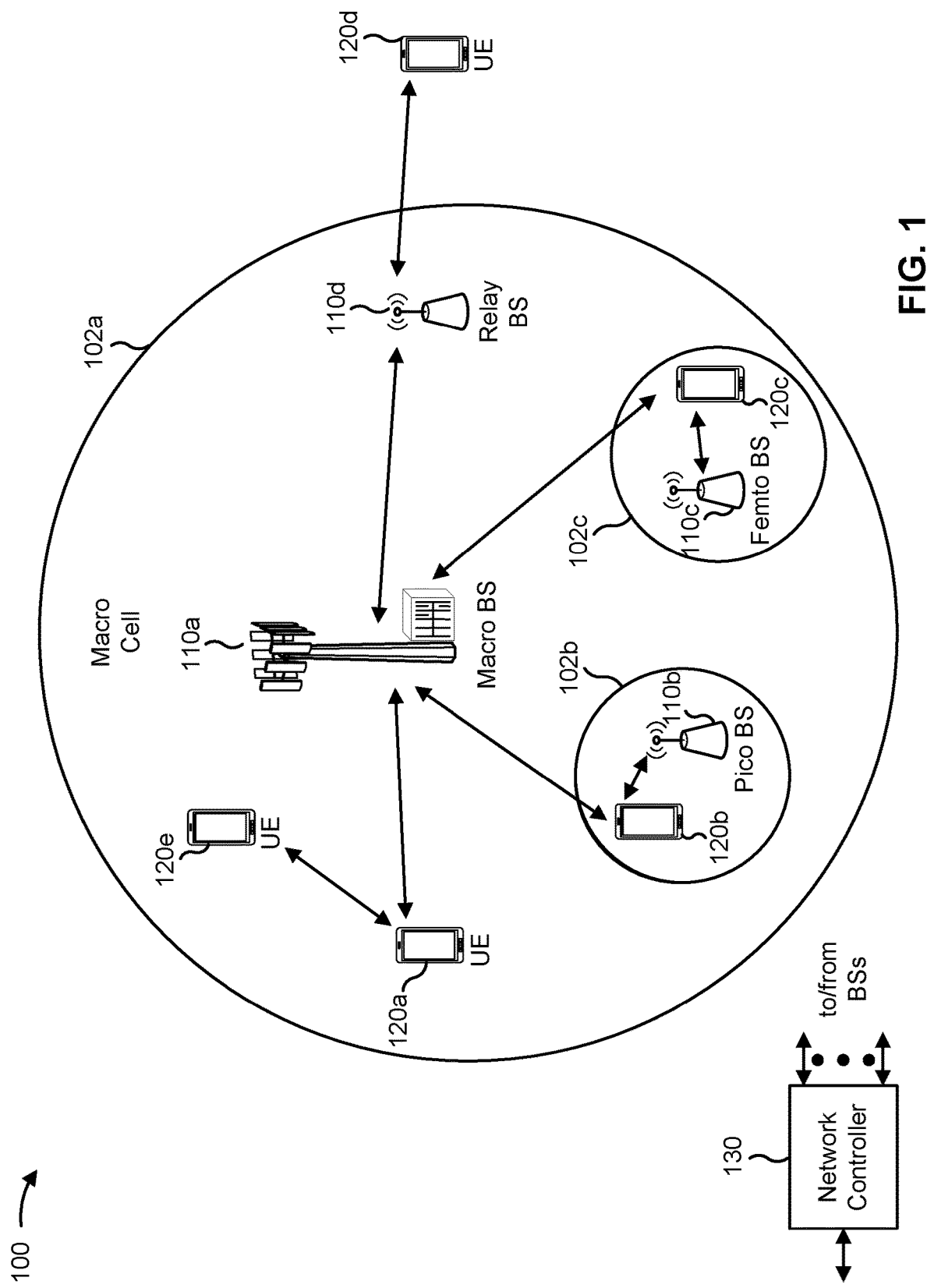
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
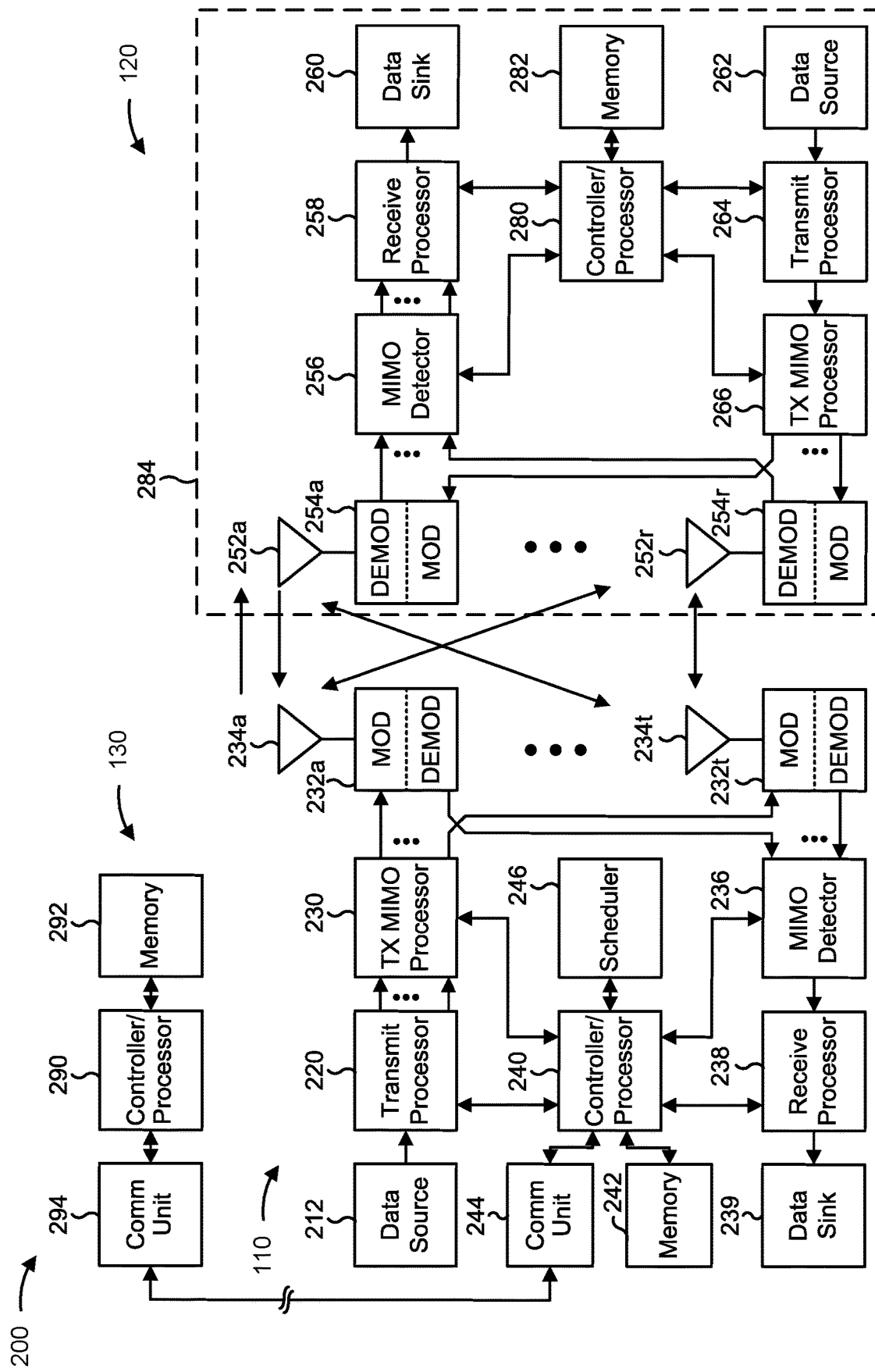
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 4-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 4-7).

Controller/processor 240 of base station 110, controller/processor 280 of UE 120, and/or any other component(s) of FIG. 2 may perform one or more techniques associated with detecting high priority paging messages for a UE with multiple subscriptions, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a network node (e.g., the base station 110 and/or the network controller 130) may include means for transmitting, in association with a first subscription of a UE (e.g., the UE 120), an indication of a high priority identifier to be used for paging messages associated with the first subscription, wherein the high priority identifier is associated with a same set of paging occasions as a second identifier allocated to the UE for paging; and/or means for transmitting, in one or more paging occasions associated with the high priority identifier and the second identifier, an indication of whether a high priority paging message is present for the UE, wherein the indication is based at least in part on the high priority identifier. In some aspects, the means for the network node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. Additionally, or alternatively, the means for the network node to perform operations described herein may include, for example, one or more of controller/processor 290, communication unit 294, or memory 292.

In some aspects, a UE (e.g., the UE 120) means for receiving, in association with a first subscription of the UE, an indication of a high priority identifier to be used for paging messages associated with the first subscription, wherein the high priority identifier is associated with a same set of paging occasions as a second identifier allocated to the UE for paging; means for tuning away from a network connection associated with a second subscription of the UE; means for monitoring one or more paging occasions associated with the high priority identifier and the second identifier based at least in part on tuning away from the network connection associated with the second subscription; and/or means for determining, using the high priority identifier, whether a high priority paging message is present for the UE based at least in part on monitoring the one or more paging occasions. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
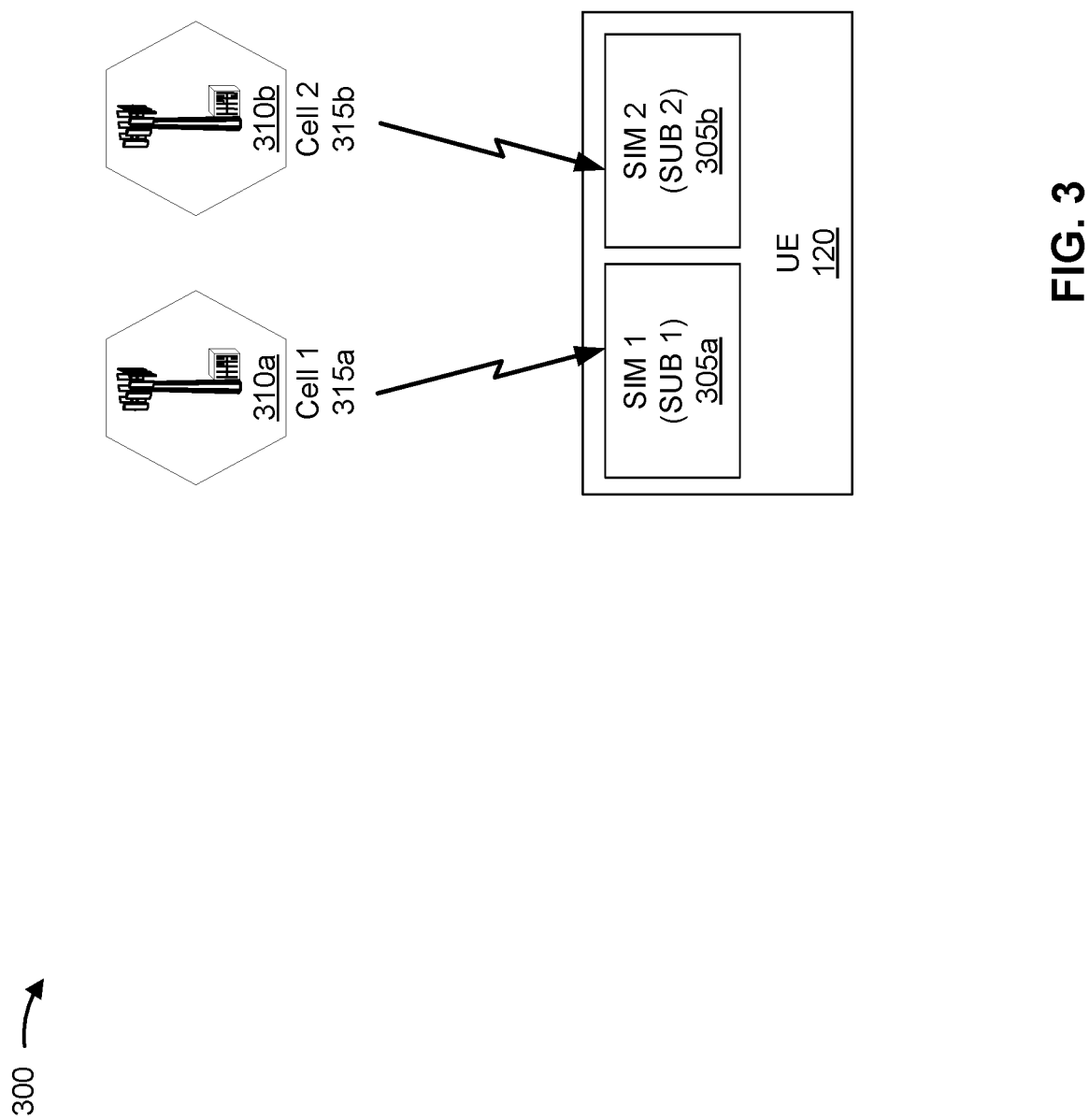
FIG. 3 is a diagram illustrating an example of a multi-subscriber identity module (multi-SIM) UE, in accordance with the present disclosure.

FIG. 3 is a diagram illustrating an example 300 of a multi-subscriber identity module (multi-SIM) UE, in accordance with the present disclosure. As shown in FIG. 3, a UE 120 may be a multi-SIM UE that includes multiple SIMs (two or more SIMs), shown as a first SIM 305a and a second SIM 305b. The first SIM 305a may be associated with a first subscription (shown as SUB 1), and the second SIM 305b may be associated with a second subscription (shown as SUB 2). A subscription may be a subscription with a network operator (for example, a mobile network operator (MNO)) that enables the UE 120 to access a wireless network (for example, a radio access network (RAN)) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310a via a first cell 315a (shown as Cell 1) using the first SIM 305a. In this case, a first subscription (SUB 1) of the UE 120 may be used to access the first cell 315a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310b via a second cell 315b (shown as Cell 2) using the second SIM 305b. In this case, a second subscription (SUB 2) of the UE 120 may be used to access the second cell 315b (for example, using a second IMSI for UE identification, using a second security key for UE authentication, using a second list of services that the UE 120 is permitted to access using the second subscription, or by counting data or voice usage on the second cell against the second subscription, among other examples).

The first base station 310a and/or the second base station 310b may include one or more of the base stations 110 described above in connection with FIG. 1. Although the first cell 315a and the second cell 315b are shown as being provided by different base stations, in some aspects, the first cell 315a and the second cell 315b may be provided by the same base station. Thus, in some aspects, the first base station 310a and the second base station 310b may be integrated into a single base station.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (MSMA) mode, such as a dual SIM dual active (DSDA) mode (e.g., when the UE 120 is associated with two subscriptions).

In a DSDA mode, the UE 120 is capable of concurrent active communication using both SIMs of the UE 120. Thus, a UE 120 in the DSDA mode is capable of communicating using the first SIM 305a (and the first subscription) at the same time as communicating using the second SIM 305b (and the second subscription). For example, when the UE 120 is in an active session (e.g., a voice call or another latency sensitive service, such as online gaming, stock trading, or an over-the-top (OTT) service) using the first SIM 305a, the UE 120 is capable of receiving a notification of a voice call using the second SIM 305b without interrupting communications that use the first SIM 305a, and without tuning or switching away from the first cell 315a to tune to the second cell 315b.

In a DSDS mode, the UE 120 is not capable of concurrent active communication using both SIMs of the UE 120. Thus, a UE 120 in the DSDS mode is not capable of communicating using the first SIM 305a (and the first subscription) at the same time as communicating using the second SIM 305b (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs and may not be capable of operating in a DSDA mode for a second combination of RATs. For example, the UE 120 may be capable of operating in a DSDA mode for NR+NR, where the first cell 315a (as well as the first SIM 305a and the first subscription) uses an NR RAT and the second cell 315b (as well as the second SIM 305b and the second subscription) also uses the NR RAT. However, the UE 120 may not be capable of operating in a DSDA mode for NR+LTE, where one of the first cell 315a (as well as the first SIM 305a and the first subscription) uses an NR RAT and the second cell 315b (as well as the second SIM 305b and the second subscription) uses an LTE RAT (or vice versa). In some aspects, the UE 120 may not be capable of operating in the DSDA mode for the second combination of RATs (e.g., NR+LTE), but the UE 120 may be capable of operating in a DSDS mode for the second combination of RATs. This UE design reduces design costs as compared to enabling the UE 120 to operate using the DSDA mode for the second combination of RATs.

As indicated above, FIG. 3 is provided as an example. Other examples may differ from what is described with regard to FIG. 3.

In some cases, a UE may be a single receiver (SR) (sometimes also referred to as single radio) multi-SIM UE, such as an SR-MSMS UE or an SR-DSDS UE, among other examples. A multi-SIM UE may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, an SR-DSDS UE or an SR-MSMS UE may only be capable of receiving data on one connection at a time because radio frequency resources are shared between the multiple subscriptions. For example, an SR-DSDS UE or an SR-MSMS UE may be associated with multiple subscriptions but may include only a single transceiver shared by the multiple subscriptions, a single transmit chain shared by the multiple subscriptions, or a single receive chain shared by the multiple subscriptions, among other examples. As a result, the UE may be unable to receive concurrent messages for multiple subscriptions.

Accordingly, a second cell may transmit a paging message for a second subscription associated with a second SIM when the UE is communicating via a first cell using a first subscription associated with a first SIM. However, the UE may be unable to determine when the paging message requires a response or other attention and when the paging message may be ignored. Accordingly, the UE risks increased latency by ignoring urgent paging messages and increased signaling overhead due to repetition of urgent paging messages from the second cell. The repetition wastes power and processing resources at the UE and at a base station of the second cell, as well as increasing network overhead. As an alternative, the UE wastes power and processing resources when responding to or otherwise acting upon a non-urgent paging message, as well as increasing latency before the UE returns to a connected state with the first cell.

Some techniques and apparatuses described herein enable a UE (e.g., a multi-SIM UE 120) to distinguish between high priority paging messages and other paging messages associated with a second subscription during a tune away from a first subscription. Accordingly, the UE 120 conserves network and processing resources by ignoring paging messages unless the base station (e.g., the second base station 310*b*) indicates that the paging message is high priority. The second base station 310*b* reduces latency and signaling overhead when transmitting paging messages classified as high priority, as well as conserving power and processing resources, by ensuring that the UE 120 responds to the high priority paging messages.

Figure 4:
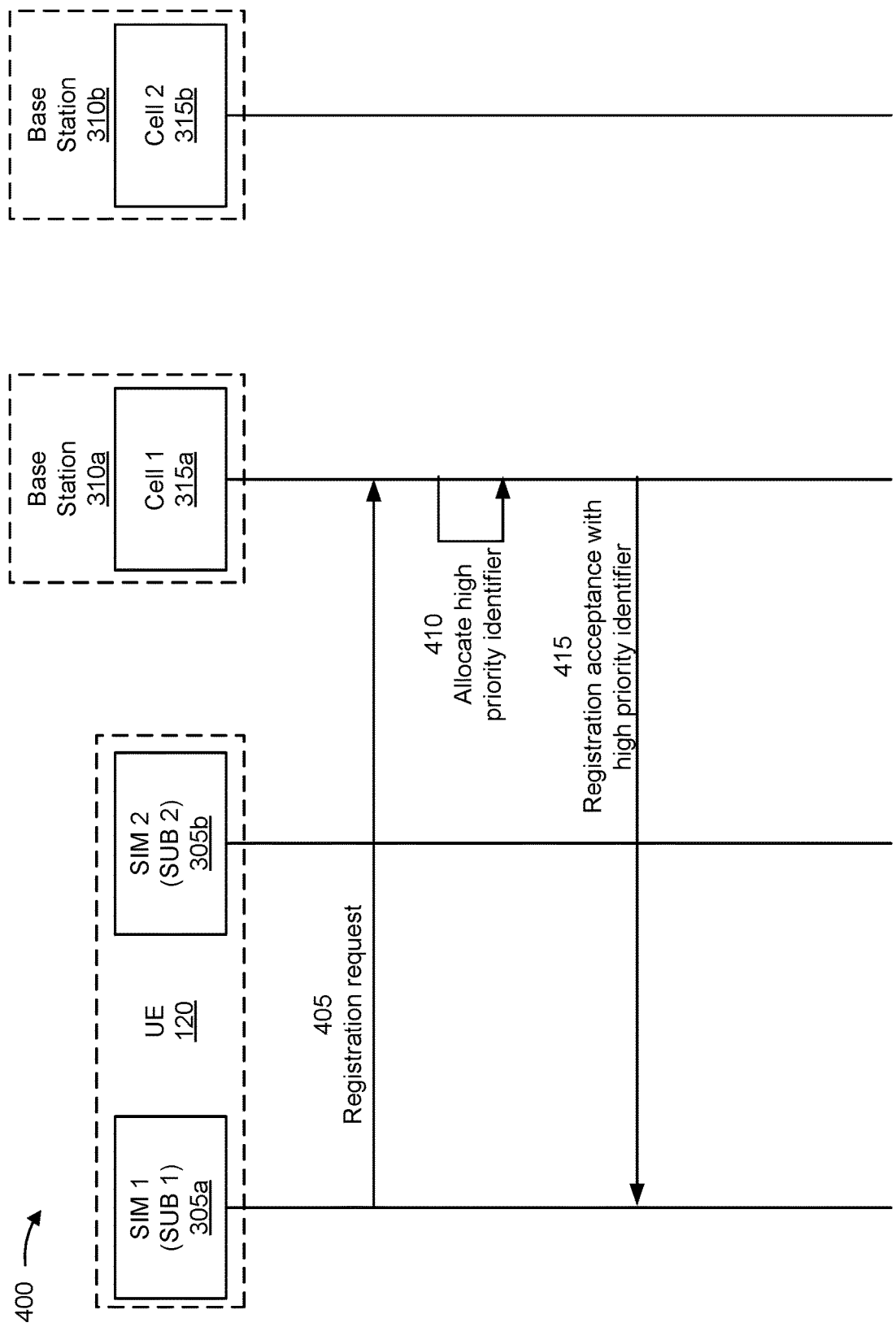
FIG. 4 is a diagram illustrating an example of a registration for a multi-SIM UE, in accordance with the present disclosure.

FIG. 4 is a diagram illustrating an example 400 of a registration for a UE 120 with multiple subscriptions, in accordance with the present disclosure. As shown in FIG. 4, a UE 120 may be a multi-SIM UE that includes multiple SIMs, shown as a first SIM 305*a* and a second SIM 305*b*, as described above in connection with FIG. 3. As also described above, the first SIM 305*a* may be associated with a first subscription (shown as SUB 1), and the second SIM 305*b* may be associated with a second subscription (shown as SUB 2). Although the description herein focuses on multiple SIMs, the description similarly applies to other techniques for associating a plurality of subscriptions with the UE 120, such as embedded SIMs, virtual SIMs, or additional techniques for storing different IMSIs, among other examples. Moreover, although the description herein focuses on two subscriptions, the description similarly applies to the UE 120 being associated with additional subscriptions (e.g., three subscriptions, four subscriptions, and so on).

As further shown in FIG. 4, the UE 120 may communicate with a first base station 310*a* via a first cell 315*a* (shown as Cell 1) using the first SIM 305*a*, and the UE 120 may communicate with a second base station 310*b* via a second cell 315*b* (shown as Cell 2) using the second SIM 305*b*, as described above in connection with FIG. 3. In FIG. 4, the first base station 310*a* and the second base station 310*b* are shown as separate base stations 110, but may be integrated into a single base station 110 in some aspects. Although the description herein focuses on the UE 120 communicating with the first base station 310*a* and/or the second base station 310*b*, the description similarly applies to the UE 120 communicating with a first core network supporting the first base station 310*a* and/or a second core network supporting the second base station 310*b*. For example, the UE 120 may communicate with the first core network and/or the second core network using non-access stratum (NAS) signaling.

As shown by reference number 405, the UE 120 may transmit a registration request to the first base station 310*a* via the first cell 315*a* for the first SIM 305*a*. For example, the UE 120 may submit a registration request or other message associated with a registration as defined in 3GPP specifications and/or another standard.

In some aspects, the UE 120 may transmit a request for a high priority identifier during a registration procedure. In some aspects, the UE 120 may include the request in an additional information requested information element or other data element associated with a registration request, as defined in 3GPP specifications and/or another standard. For example, the request may be included in one or more bits (e.g., bit 2, bit 3, or so on) in one or more octets (e.g., octet 3, octet 4, or so on) of the additional information requested information element. As an alternative, the UE 120 may transmit the request for a high priority identifier in a message separate from the registration request. In some aspects, the UE 120 may still transmit the separate message during the registration procedure.

In some aspects, the high priority identifier may include a temporary mobile subscriber identity (TMSI). As an alternative, the high priority identifier may include a different high priority UE identifier (UE ID).

As shown by reference number 410, the first base station 310*a* may allocate the high priority identifier to the first SIM 305*a* based at least in part on receiving the request from the UE 120. In some aspects, the high priority identifier may include a same set of bits as a second identifier allocated to the UE 120 for paging, where the same set of bits is used to calculate a UE ID of the UE 120. Accordingly, a paging occasion associated with the second identifier and a paging occasion associated with the high priority identifier may fall on a same timepoint. In some aspects, the first base station 310*a* may use a high priority TMSI and a second TMSI for the UE such that an expression similar to the following form is satisfied:

$$(5G\text{-}S\text{-}TMSI \text{ XOR } 5G\text{-}HP\text{-}TMSI) \bmod 1024 = 0,$$

where 5G-S-TMSI may represent the second TMSI, and 5G-HP-TMSI may represent the high priority TMSI. This example expression may ensure that the same 10 bits of the second TMSI and the high priority TMSI are used to calculate a UE ID associated with the UE 120. In some aspects, the first base station 310a may include more than 10 same bits or fewer than 10 same bits in both the second TMSI and the high priority TMSI, where the same bits are used to calculate the UE ID.

In some aspects, the high priority identifier may include a same number of bits as the second identifier. For example, the high priority identifier and the second identifier may both include 48 bits. In some aspects, the first base station 310a may include more than 48 bits or fewer than 48 bits in both the second identifier and the high priority identifier. Additionally, or alternatively, the high priority identifier may be unique for the UE 120 within a tracking area. For example, the tracking area may include all or a portion of the first cell 315a. In some aspects, the tracking area may additionally, or alternatively, include all or a portion of the second cell 315b and/or other additional cells.

As shown by reference number 415, the base station 310a may transmit, and the UE 120 may receive, in association with a first subscription of the UE 120, the high priority identifier to be used for paging messages associated with the first subscription. As described above, the high priority identifier may be associated with a same set of paging occasions as a second identifier allocated to the UE for paging.

In some aspects, as shown in FIG. 4, the first base station 310a may transmit the high priority identifier based at least in part on receiving a request from the UE 120 for the high priority identifier during a registration procedure. Accordingly, the UE 120 may receive the high priority identifier based at least in part on transmitting the request. For example, the first base station 310a may include the high priority identifier in a registration accept message or other message associated with a registration as defined in 3GPP specifications and/or another standard. For example, the high priority identifier may be included in one or more octets (e.g., octets 7 through 10, octets 8 through 10, or so on) of the registration accept message. As an alternative, the first base station 310a may transmit the high priority identifier in a message separate from the registration accept message. In some aspects, the first base station 310a may still transmit the separate message during the registration procedure.

Although depicted for the first SIM 305a registering with the first base station 310a, operations depicted in FIG. 4 may additionally, or alternatively, include the second SIM 305b registering with the second base station 310b. For example, the UE 120 may transmit a registration request to the second base station 310b via the second cell 315b for the second SIM 305b; the second base station 310b may allocate a high priority identifier to the second SIM 305b based at least in part on receiving the request from the UE 120; and the UE 120 may receive, in association with a second subscription of the UE 120, the high priority identifier to be used for paging messages associated with the second subscription.

In some aspects, the first base station 310a may use the high priority identifier to indicate when a paging message for the first SIM 305a requires a response or other attention. As a result, network resources are conserved when the first base station 310a requires a response or other attention to a paging message by reducing a need for the first base station 310a to repeat the paging message. The UE 120 may also determine when a paging message from the first base station 310a can be ignored. As a result, the UE 120 conserves power and processing resources when the paging message does not require a response or other action from the UE 120.

As indicated above, FIG. 4 is provided as an example. Other examples may differ from what is described with regard to FIG. 4.

Figure 5:
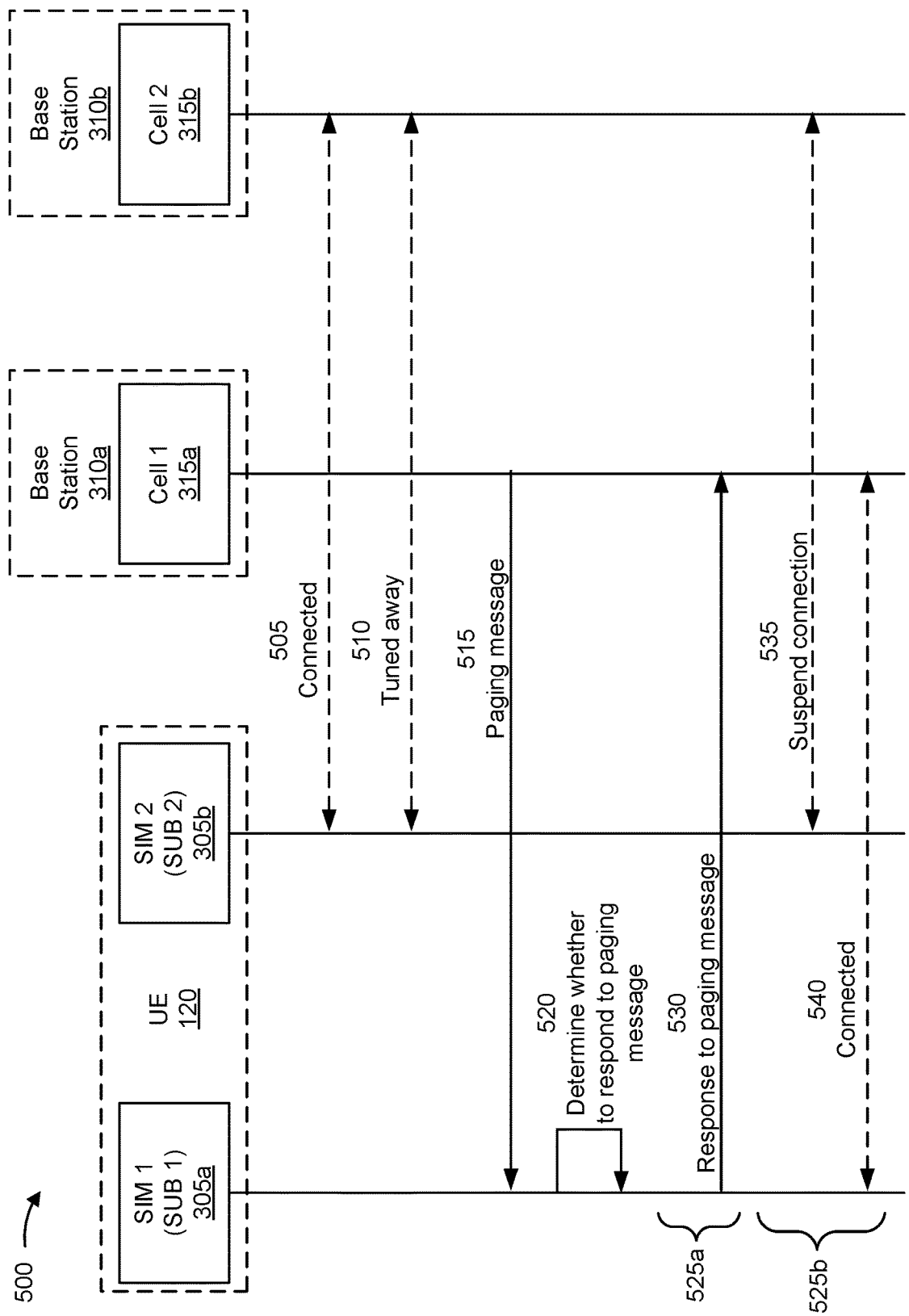
FIG. 5 is a diagram illustrating an example associated with detecting high priority paging messages for a multi-SIM UE, in accordance with the present disclosure.

FIG. 5 is a diagram illustrating an example 500 of detecting high priority paging messages for a UE with multiple subscriptions, in accordance with the present disclosure. FIG. 5 shows an example call flow where the UE 120 receives a paging message from a first cell 315a, associated with a first subscription of the UE 120, and determines whether to respond to or otherwise act upon the paging message. As shown in FIG. 5, the UE 120 may be a multi-SIM UE that includes multiple SIMs 305 and multiple subscriptions. Although the description herein focuses on multiple SIMs, the description similarly applies to other techniques for associating a plurality of subscriptions with the UE 120, such as embedded SIMs, virtual SIMs, or additional techniques for storing different IMSIs, among other examples. Moreover, although the description herein focuses on two subscriptions, the description similarly applies to the UE 120 being associated with additional subscriptions (e.g., three subscriptions, four subscriptions, and so on).

As further shown in FIG. 4, the UE 120 may communicate with a first base station 310a via a first cell 315a (shown as Cell 1) using the first SIM 305a, and the UE 120 may communicate with a second base station 310b via a second cell 315b (shown as Cell 2) using the second SIM 305b, as described above in connection with FIG. 4. In FIG. 5, the first base station 310a and the second base station 310b are shown as separate base stations 110, but may be integrated into a single base station 110 in some aspects. Although the description herein focuses on the UE 120 communicating with the first base station 310a and/or the second base station 310b, the description similarly applies to the UE 120 communicating with a first core network supporting the first base station 310a and/or a second core network supporting the second base station 310b. For example, the UE 120 may communicate with the first core network and/or the second core network using NAS signaling.

As shown by reference number 505, the UE 120 may be active on a network connection associated with a second subscription of the UE 120. For example, the UE 120 may communicate with the second base station 310b via the second cell 315b.

As shown by reference number 510, the UE 120 may tune away from the network connection associated with the second subscription of the UE 120. For example, the UE 120 may tune away from a connection with the second base station 310b. In some aspects, the UE 120 may coordinate with the first base station 310a and/or the second base station 310b to configure the tune away.

As shown by reference number 515, the UE 120 may monitor one or more paging occasions associated with a high priority identifier and a second identifier based at least in part on tuning away from the network connection associated with the second subscription. For example, the high priority identifier and/or the second identifier may have been allocated to the UE 120 during a registration procedure with the first base station 310a (e.g., as described above in connection with FIG. 4). Additionally, or alternatively, the high priority identifier and/or the second identifier may have been allocated to the UE 120 during a communication with the first base station 310a separate from the registration procedure.

As further shown by reference number 515, the first base station 310*a* may transmit, in the one or more paging occasions associated with the high priority identifier and the second identifier, an indication of whether a high priority paging message is present for the UE 120. The indication may be based at least in part on the high priority identifier. For example, as described below, the indication may be included in downlink control information (DCI) that includes a short message, where the short message includes the indication, and/or a physical downlink shared channel (PDSCH) communication scheduled by the DCI, where a paging record in the PDSCH communication satisfies a condition associated with the high priority identifier.

The UE 120 may determine, using the high priority identifier, whether a high priority paging message is present for the UE 120 based at least in part on monitoring the one or more paging occasions. For example, the UE 120 may have received (e.g., transmitted from the first base station 310*a*), in association with a first subscription of the UE 120, the high priority identifier to be used for paging messages associated with the first subscription, where the high priority identifier is associated with a same set of paging occasions as a second identifier allocated to the UE 120 for paging. In some aspects, the UE 120 may have transmitted a request for the high priority identifier during a registration procedure and received the high priority identifier based at least in part on transmitting the request (e.g., as described above in connection with FIG. 4). Additionally, or alternatively, as described above, the UE 120 may have transmitted the request for the high priority identifier during a communication with the first base station 310*a* separate from the registration procedure.

In some aspects (e.g., as described above in connection with FIG. 4), the high priority identifier and the second identifier may include a same set of bits used to calculate a UE identifier of the UE 120 for paging. Additionally, or alternatively (e.g., as described above in connection with FIG. 4), the high priority identifier may include a same number of bits as the second identifier and be unique for the UE 120 within a tracking area.

In some aspects, the UE 120 may determine whether the high priority paging message is present for the UE 120 based at least in part on receiving DCI (e.g., scrambled using a paging radio network temporary identifier (P-RNTI)), that includes a short message, and determining that the short message includes an indication of a high priority paging message. For example, a single bit of the short message may indicate whether the high priority paging message is present in the paging record. In some aspects, the single bit may comprise the third bit or other bit of a DCI format 1_0 or other DCI format as defined in 3GPP specifications and/or another standard. For example, the third bit or other bit may be set to 1 to indicate that the high priority paging message is present in the paging record. Similarly, the third bit or other bit may be set to 0 to indicate that the high priority paging message is not present in the paging record.

In some aspects, the UE 120 may further decode a PDSCH communication scheduled by the DCI based at least in part on determining that the short message includes the indication of the high priority paging message and determine that a paging record in the PDSCH communication satisfies a condition associated with the high priority identifier. For example, as described above, the base station 310*a* may transmit the DCI (e.g., scrambled using the P-RNTI), that includes the short message, where the short message includes the indication of a high priority paging message, and transmit the PDSCH communication scheduled by the DCI, where the paging record in the PDSCH communication satisfies the condition associated with the high priority identifier. In some aspects, the condition is that the paging record includes a UE ID that matches the high priority identifier. For example, as explained above with respect to FIG. 4, the UE ID may be determined based at least in part on the high priority identifier.

In some aspects, the UE 120 may decode the PDSCH communication scheduled by the DCI regardless of whether the short message includes the indication of the high priority paging message. For example, the UE 120 may decode the PDSCH communication scheduled by the DCI and determine whether the high priority paging message is present for the UE 120 based at least in part on whether a paging record in the PDSCH communication satisfies the condition associated with the high priority identifier. In some aspects, as described above, the condition is that the paging record includes a UE identifier that matches the high priority identifier.

As an alternative, the base station 310*a* may transmit a short message, included in DCI (e.g., scrambled using the P-RNTI), that includes an indication that the high priority paging message is not present in a paging record included in a PDSCH communication scheduled by the DCI and/or transmit the paging record, where the paging record does not include a UE identifier that matches the high priority identifier. Accordingly, the UE 120 may determine, at reference number 520, to ignore one or more paging messages based at least in part on a determination that the high priority paging message is not present for the UE 120. For example, the UE 120 may determine that the short message, included in DCI (e.g. scrambled using the P-RNTI), includes the indication that the high priority paging message is not present in the paging record included in the PDSCH communication scheduled by the DCI and/or determine that the paging record does not include the UE identifier that matches the high priority identifier. In some aspects, the UE 120 may also determine not to decode the PDSCH communication scheduled by the UE 120 when the short message includes the indication that the high priority paging message is not present in the paging record.

As shown by reference number 520, the UE 120 may determine whether to respond to or otherwise act upon the paging message. For example, the UE 120 may determine to respond to or otherwise act upon the paging message based at least in part on the short message including the indication that the high priority paging message is present in the paging record and/or the paging record in the PDSCH communication satisfying the condition associated with the high priority identifier.

For example, as shown by reference number 525*a*, the UE 120 may respond to the high priority paging message based at least in part on a determination that the high priority paging message is present for the UE. For example, as shown by reference number 530, UE 120 may respond using a physical uplink shared channel (PUSCH) communication corresponding to the PDSCH communication or using another uplink communication transmitted to the first base station 310*a*.

Additionally, or alternatively, as shown by reference number 525*b*, the UE 120 may suspend the network connection associated with the second subscription and establish a network connection associated with the first subscription based at least in part on a determination that the high priority paging message is present for the UE 120. For example, as shown by reference number 535, the UE 120 may suspend communication with the second base station 310*b* via the second cell 315*b* and, as shown by reference number 540, establish communication with the first base station 310*a* via the first cell 315*a*.

Although depicted with the UE 120 determining whether to respond to or otherwise act upon a paging message for the first SIM 305*a* and from the first base station 310*a*, operations depicted in FIG. 5 may be additionally, or alternatively, include the UE 120 determining whether to respond to or otherwise act upon a paging message for the second SIM 305*b* and from the second base station 310*b*. For example, the UE 120 may tune away from the network connection associated with the first subscription of the UE 120 and monitor one or more paging occasions associated with a high priority identifier and a second identifier based at least in part on tuning away from the network connection associated with the first subscription; the second base station 310*b* may transmit, in the one or more paging occasions associated with the high priority identifier and the second identifier, an indication of whether a high priority paging message is present for the UE 120; and the UE 120 may determine, using the high priority identifier, whether a high priority paging message is present for the UE 120 based at least in part on monitoring the one or more paging occasions. In this example, the UE 120 may ignore one or more paging messages from the second base station 310*b* based at least in part on a determination that the high priority paging message is not present for the UE 120. As an alternative, the UE 120 may respond to or otherwise act upon a high priority paging message from the second base station 310*b* based at least in part on a determination that the high priority paging message is present for the UE 120.

By using techniques as described in connection with FIG. 5, the UE 120 may determine whether paging messages, associated with a second subscription and received during a tune away from a first subscription, are high priority. As a result, the UE conserves power and processing resources by ignoring non-urgent paging messages. Meanwhile, by indicating a paging message as high priority, the base station 310*a* conservers network overhead, as well as processing resources and power, that would otherwise be used to repeatedly transmit the paging message to the UE 120.

As indicated above, FIG. 5 is provided as an example. Other examples may differ from what is described with regard to FIG. 5.

Figure 6:
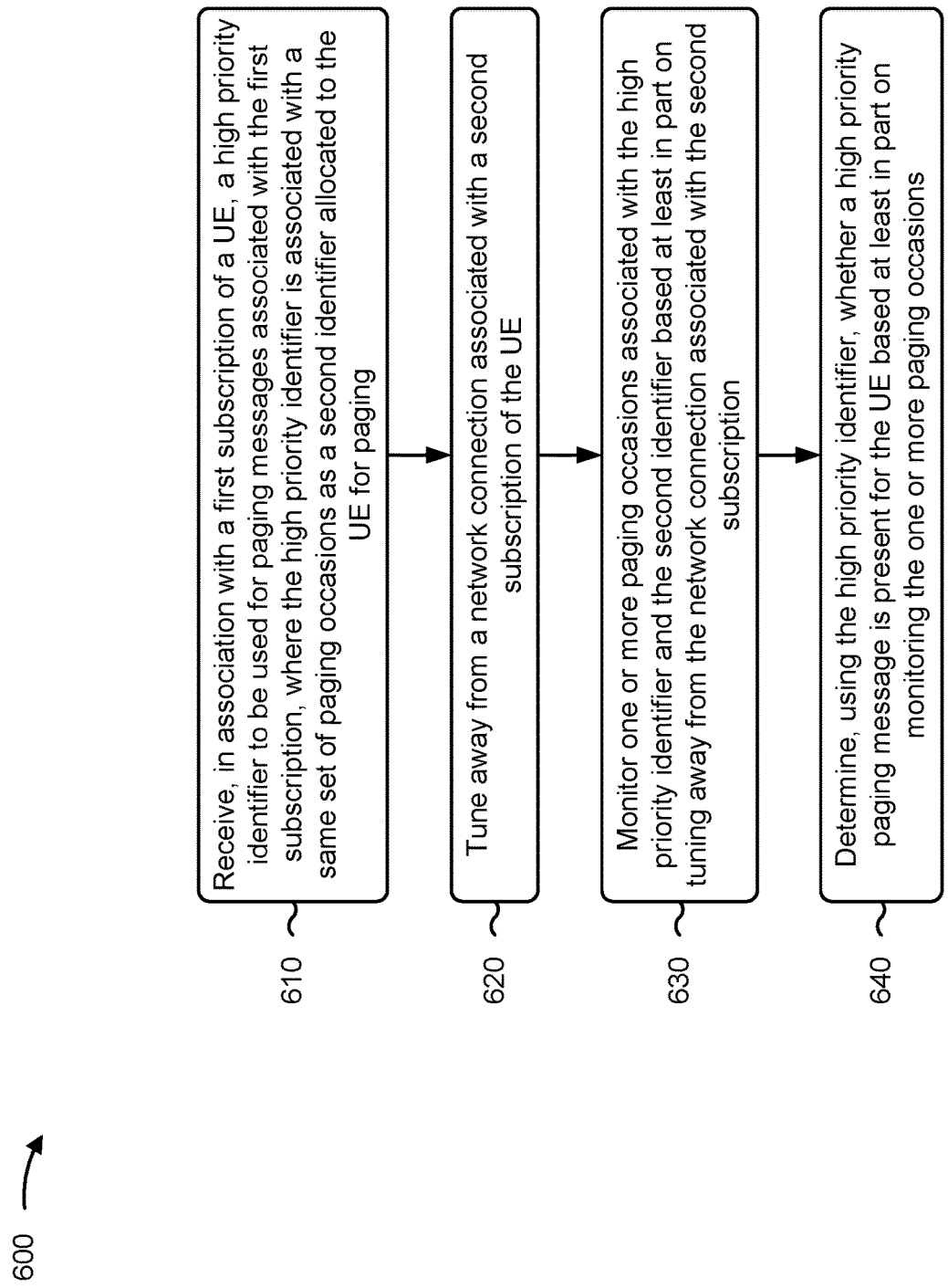
FIG. 6 is a diagram illustrating an example process performed by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with detecting high priority paging messages.

As shown in FIG. 6, in some aspects, process 600 may include receiving, in association with a first subscription of the UE, an indication of a high priority identifier to be used for paging messages associated with the first subscription (block 610). For example, the UE (e.g., using antenna 252, demodulator 254, MIMO detector 256, receive processor 258, controller/processor 280, and/or memory 282) may receive an indication of a high priority identifier to be used for paging messages associated with the first subscription, as described herein. In some aspects, the high priority identifier is associated with a same set of paging occasions as a second identifier allocated to the UE for paging.

As further shown in FIG. 6, in some aspects, process 600 may include tuning away from a network connection associated with a second subscription of the UE (block 620). For example, the UE (e.g., using antenna 252, demodulator 254, MIMO detector 256, receive processor 258, transmit processor 264, TX MIMO processor 266, modulator 254, controller/processor 280, and/or memory 282) may tune away from a network connection associated with a second subscription of the UE, as described herein.

As further shown in FIG. 6, in some aspects, process 600 may include monitoring one or more paging occasions associated with the high priority identifier and the second identifier based at least in part on tuning away from the network connection associated with the second subscription (block 630). For example, the UE (e.g., using antenna 252, demodulator 254, MIMO detector 256, receive processor 258, controller/processor 280, and/or memory 282) may monitor one or more paging occasions associated with the high priority identifier and the second identifier based at least in part on tuning away from the network connection associated with the second subscription, as described herein.

As further shown in FIG. 6, in some aspects, process 600 may include determining, using the high priority identifier, whether a high priority paging message is present for the UE based at least in part on monitoring the one or more paging occasions (block 640). For example, the UE (e.g., using demodulator 254, MIMO detector 256, receive processor 258, controller/processor 280, and/or memory 282) may determine, using the high priority identifier, whether a high priority paging message is present for the UE based at least in part on monitoring the one or more paging occasions, as described herein.

Process 600 may include additional aspects, such as any single aspect or any combination of aspects described below and/or in connection with one or more other processes described elsewhere herein.

In a first aspect, the UE is a multi-SIM UE that includes at least a first SIM for the first subscription and a second SIM for the second subscription.

In a second aspect, alone or in combination with the first aspect, process 600 further includes transmitting (e.g., using antenna 252, transmit processor 264, TX MIMO processor 266, modulator 254, controller/processor 280, and/or memory 282) a request for the high priority identifier during a registration procedure, such that the high priority identifier is received based at least in part on transmitting the request.

In a third aspect, alone or in combination with one or more of the first and second aspects, determining whether the high priority paging message is present for the UE includes determining that the high priority paging message is present for the UE based at least in part on: receiving (e.g., using antenna 252, demodulator 254, MIMO detector 256, receive processor 258, controller/processor 280, and/or memory 282) DCI that includes a short message; determining (e.g., using demodulator 254, MIMO detector 256, receive processor 258, controller/processor 280, and/or memory 282) that the short message includes an indication of a high priority paging message; decoding (e.g., using demodulator 254, MIMO detector 256, receive processor 258, controller/processor 280, and/or memory 282) a PDSCH communication scheduled by the DCI based at least in part on determining that the short message includes the indication of the high priority paging message, and determining (e.g., using demodulator 254, MIMO detector 256, receive processor 258, controller/processor 280, and/or memory 282) that a paging record in the PDSCH communication satisfies a condition associated with the high priority identifier.

In a fourth aspect, alone or in combination with one or more of the first through third aspects, the condition is that the paging record includes a UE identifier that matches the high priority identifier.

In a fifth aspect, alone or in combination with one or more of the first through fourth aspects, a single bit of the short message indicates whether the high priority paging message is present in the paging record.

In a sixth aspect, alone or in combination with one or more of the first through fifth aspects, process 600 further includes responding (e.g., using antenna 252, transmit processor 264, TX MIMO processor 266, modulator 254, controller/processor 280, or memory 282) to the high priority paging message based at least in part on a determination that the high priority paging message is present for the UE.

In a seventh aspect, alone or in combination with one or more of the first through sixth aspects, process 600 further includes suspending (e.g., using antenna 252, demodulator 254, MIMO detector 256, receive processor 258, transmit processor 264, TX MIMO processor 266, modulator 254, controller/processor 280, and/or memory 282) the network connection associated with the second subscription and establishing (e.g., using antenna 252, demodulator 254, MIMO detector 256, receive processor 258, transmit processor 264, TX MIMO processor 266, modulator 254, controller/processor 280, and/or memory 282) a network connection associated with the first subscription based at least in part on a determination that the high priority paging message is present for the UE.

In an eighth aspect, alone or in combination with one or more of the first through seventh aspects, determining whether the high priority paging message is present for the UE includes determining that the high priority paging message is not present for the UE based at least in part on at least one of: a determination that a short message, included in DCI, includes an indication that the high priority paging message is not present in a paging record included in a physical downlink shared channel communication scheduled by the DCI; or a determination that the paging is recording does not include a UE identifier that matches the high priority identifier.

In a ninth aspect, alone or in combination with one or more of the first through eighth aspects, process 600 further includes ignoring (e.g., using antenna 252, demodulator 254, MIMO detector 256, receive processor 258, controller/processor 280, and/or memory 282) one or more paging messages based at least in part on a determination that the high priority paging message is not present for the UE.

In a tenth aspect, alone or in combination with one or more of the first through ninth aspects, the high priority identifier and the second identifier include a same set of bits used to calculate a UE identifier of the UE for paging.

In an eleventh aspect, alone or in combination with one or more of the first through tenth aspects, the high priority identifier includes a same number of bits as the second identifier and is unique for the UE within a tracking area.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
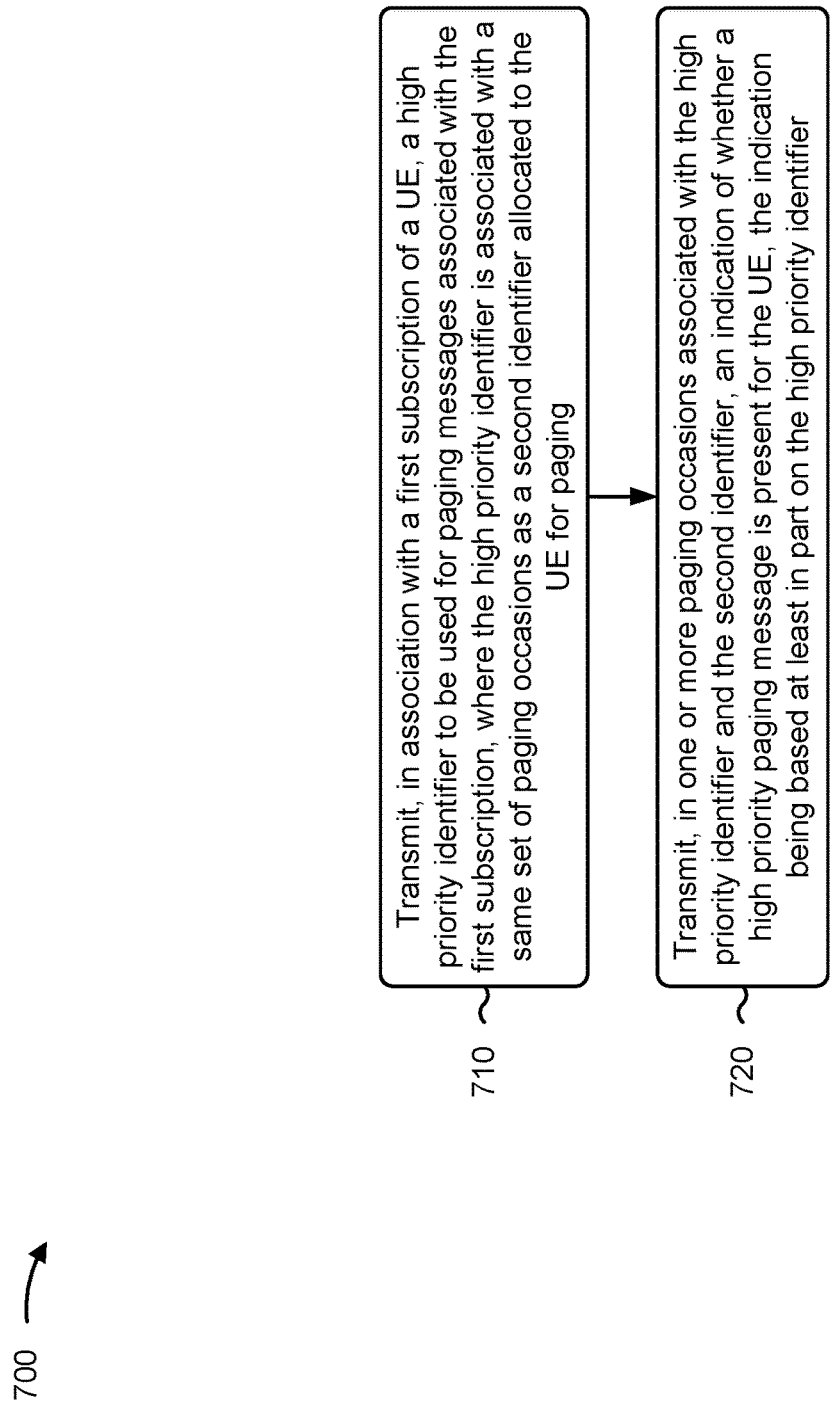
FIG. 7 is a diagram illustrating an example process performed by a network node, in accordance with the present disclosure.

FIG. 7 is a diagram illustrating an example process 700 performed, for example, by a network node, in accordance with various aspects of the present disclosure. Example process 700 is an example where the network node (e.g., base station 110 and/or a node of a core network supporting the base station 110, such as network controller 130) performs operations associated with transmitting high priority paging messages for a UE (e.g., UE 120) with multiple subscriptions.

As shown in FIG. 7, in some aspects, process 700 may include transmitting, in association with a first subscription of a UE, a high priority identifier to be used for paging messages associated with the first subscription (block 710). For example, the network node (e.g., using transmit processor 220, TX MIMO processor 230, modulator 232, antenna 234, controller/processor 240, memory 242, scheduler 246, controller/processor 290, communication unit 294, and/or memory 292) may transmit, in association with a first subscription of a UE, a high priority identifier to be used for paging messages associated with the first subscription, as described herein. In some aspects, the high priority identifier is associated with a same set of paging occasions as a second identifier allocated to the UE for paging.

As further shown in FIG. 7, in some aspects, process 700 may include transmitting, in one or more paging occasions associated with the high priority identifier and the second identifier, an indication of whether a high priority paging message is present for the UE (block 720). For example, the network node (e.g., using transmit processor 220, TX MIMO processor 230, modulator 232, antenna 234, controller/processor 240, memory 242, scheduler 246, controller/processor 290, communication unit 294, and/or memory 292) may transmit, in one or more paging occasions associated with the high priority identifier and the second identifier, an indication of whether a high priority paging message is present for the UE, as described herein. In some aspects, the indication is based at least in part on the high priority identifier.

Process 700 may include additional aspects, such as any single aspect or any combination of aspects described below and/or in connection with one or more other processes described elsewhere herein.

In a first aspect, the UE is a multi-SIM UE that includes at least a first SIM for the first subscription and a second SIM for a second subscription.

In a second aspect, alone or in combination with the first aspect, process 700 further includes receiving (e.g., using antenna 234, demodulator 232, MIMO detector 236, receive processor 238, controller/processor 240, memory 242, scheduler 246, controller/processor 290, communication unit 294, and/or memory 292) a request from the UE for the high priority identifier during a registration procedure, such that the high priority identifier is transmitted based at least in part on receiving the request.

In a third aspect, alone or in combination with one or more of the first and second aspects, transmitting the indication of whether the high priority paging message is present for the UE includes transmitting an indication that the high priority paging message is present for the UE based at least in part on: transmitting (e.g., using transmit processor 220, TX MIMO processor 230, modulator 232, antenna 234, controller/processor 240, memory 242, scheduler 246, controller/processor 290, communication unit 294, and/or memory 292) DCI that includes a short message, the short message including an indication of a high priority paging message; and transmitting (e.g., using transmit processor 220, TX MIMO processor 230, modulator 232, antenna 234, controller/processor 240, memory 242, scheduler 246, controller/processor 290, communication unit 294, and/or memory 292) a PDSCH communication scheduled by the DCI, where a paging record in the PDSCH communication satisfies a condition associated with the high priority identifier.

In a fourth aspect, alone or in combination with one or more of the first through third aspects, the condition is that the paging record includes a UE identifier that matches the high priority identifier.

In a fifth aspect, alone or in combination with one or more of the first through fourth aspects, a single bit of the short message indicates whether the high priority paging message is present in the paging record.

In a sixth aspect, alone or in combination with one or more of the first through fifth aspects, transmitting the indication of whether the high priority paging message is present for the UE includes transmitting an indication that the high priority paging message is not present for the UE based at least in part on: transmitting (e.g., using transmit processor 220, TX MIMO processor 230, modulator 232, antenna 234, controller/processor 240, memory 242, scheduler 246, controller/processor 290, communication unit 294, and/or memory 292) a short message, included in DCI, that includes an indication that the high priority paging message is not present in a paging record included in a PDSCH communication scheduled by the DCI; or transmitting (e.g., using transmit processor 220, TX MIMO processor 230, modulator 232, antenna 234, controller/processor 240, memory 242, scheduler 246, controller/processor 290, communication unit 294, and/or memory 292) the paging record, where the paging record does not include a UE identifier that matches the high priority identifier.

In a seventh aspect, alone or in combination with one or more of the first through sixth aspects, the high priority identifier and the second identifier include a same set of bits used to calculate a UE identifier of the UE for paging.

In an eighth aspect, alone or in combination with one or more of the first through seventh aspects, the high priority identifier includes a same number of bits as the second identifier and is unique for the UE within a tracking area.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: receiving, in association with a first subscription of the UE, an indication of a high priority identifier to be used for paging messages associated with the first subscription, wherein the high priority identifier is associated with a same set of paging occasions as a second identifier allocated to the UE for paging; tuning away from a network connection associated with a second subscription of the UE; monitoring one or more paging occasions associated with the high priority identifier and the second identifier based at least in part on tuning away from the network connection associated with the second subscription; and determining, using the high priority identifier, whether a high priority paging message is present for the UE based at least in part on monitoring the one or more paging occasions.

Aspect 2: The method of Aspect 1, wherein the UE is a multi-subscriber identity module UE that includes at least a first SIM for the first subscription and a second SIM for the second subscription.

Aspect 3: The method of any of Aspects 1 through 2, further comprising: transmitting a request for the high priority identifier during a registration procedure, wherein the high priority identifier is received based at least in part on transmitting the request.

Aspect 4: The method of any of Aspects 1 through 3, wherein determining whether the high priority paging message is present for the UE comprises determining that the high priority paging message is present for the UE based at least in part on: receiving downlink control information (DCI) that includes a short message; determining that the short message includes an indication of a high priority paging message; decoding a physical downlink shared channel (PDSCH) communication scheduled by the DCI based at least in part on determining that the short message includes the indication of the high priority paging message; and determining that a paging record in the PDSCH communication satisfies a condition associated with the high priority identifier.

Aspect 5: The method of Aspect 4, wherein the condition is that the paging record includes a UE identifier that matches the high priority identifier.

Aspect 6: The method of any of Aspects 4 through 5, wherein a single bit of the short message indicates whether the high priority paging message is present in the paging record.

Aspect 7: The method of any of Aspects 1 through 6, further comprising: responding to the high priority paging message based at least in part on a determination that the high priority paging message is present for the UE.

Aspect 8: The method of any of Aspects 1 through 7, further comprising: suspending the network connection associated with the second subscription; and establishing a network connection associated with the first subscription based at least in part on a determination that the high priority paging message is present for the UE.

Aspect 9: The method of any of Aspects 1 through 3, wherein determining whether the high priority paging message is present for the UE comprises determining that the high priority paging message is not present for the UE based at least in part on at least one of: a determination that a short message, included in downlink control information (DCI), includes an indication that the high priority paging message is not present in a paging record included in a physical downlink shared channel communication scheduled by the DCI; or a determination that the paging record does not include a UE identifier that matches the high priority identifier.

Aspect 10: The method of Aspect 9, further comprising ignoring one or more paging messages based at least in part on a determination that the high priority paging message is not present for the UE.

Aspect 11: The method of any of Aspects 1 through 10, wherein the high priority identifier and the second identifier include a same set of bits used to calculate a UE identifier of the UE for paging.

Aspect 12: The method of any of Aspects 1 through 11, wherein the high priority identifier includes a same number of bits as the second identifier and is unique for the UE within a tracking area.

Aspect 13: A method of wireless communication performed by a network node, comprising: transmitting, in association with a first subscription of a user equipment (UE), an indication of a high priority identifier to be used for paging messages associated with the first subscription, wherein the high priority identifier is associated with a same set of paging occasions as a second identifier allocated to the UE for paging; and transmitting, in one or more paging occasions associated with the high priority identifier and the second identifier, an indication of whether a high priority paging message is present for the UE, wherein the indication is based at least in part on the high priority identifier.

Aspect 14: The method of Aspect 13, wherein the UE is a multi-subscriber identity module UE that includes at least a first SIM for the first subscription and a second SIM for a second subscription.

Aspect 15: The method of any of Aspects 13 through 14, wherein the high priority identifier is transmitted based at least in part on receiving a request from the UE for the high priority identifier during a registration procedure.

Aspect 16: The method of any of Aspects 13 through 15, wherein transmitting the indication of whether the high priority paging message is present for the UE comprises: transmitting an indication that the high priority paging message is present for the UE based at least in part on: transmitting downlink control information (DCI) that includes a short message, wherein the short message includes an indication of a high priority paging message; and transmitting a physical downlink shared channel (PDSCH) communication scheduled by the DCI, wherein a paging record in the PDSCH communication satisfies a condition associated with the high priority identifier.

Aspect 17: The method of Aspect 16, wherein the condition is that the paging record includes a UE identifier that matches the high priority identifier.

Aspect 18: The method of any of Aspects 16 through 17, wherein a single bit of the short message indicates whether the high priority paging message is present in the paging record.

Aspect 19: The method of any of Aspects 13 through 15, wherein transmitting the indication of whether the high priority paging message is present for the UE comprises transmitting an indication that the high priority paging message is not present for the UE based at least in part on: transmitting a short message, included in downlink control information (DCI), that includes an indication that the high priority paging message is not present in a paging record included in a physical downlink shared channel communication scheduled by the DCI; or transmitting the paging record, wherein the paging record does not include a UE identifier that matches the high priority identifier.

Aspect 20: The method of any of Aspects 13 through 19, wherein the high priority identifier and the second identifier include a same set of bits used to calculate a UE identifier of the UE for paging.

Aspect 21: The method of any of Aspects 13 through 20, wherein the high priority identifier includes a same number of bits as the second identifier and is unique for the UE within a tracking area.

Aspect 22: An apparatus for wireless communication at a device, comprising a processor; memory coupled with the processor; and instructions stored in the memory and executable by the processor to cause the apparatus to perform the method of one or more of Aspects 1-12.

Aspect 23: A device for wireless communication, comprising a memory and one or more processors coupled to the memory, the one or more processors configured to perform the method of one or more of Aspects 1-12.

Aspect 24: An apparatus for wireless communication, comprising at least one means for performing the method of one or more of Aspects 1-12.

Aspect 25: A non-transitory computer-readable medium storing code for wireless communication, the code comprising instructions executable by a processor to perform the method of one or more of Aspects 1-12.

Aspect 26: A non-transitory computer-readable medium storing a set of instructions for wireless communication, the set of instructions comprising one or more instructions that, when executed by one or more processors of a device, cause the device to perform the method of one or more of Aspects 1-12.

Aspect 27: An apparatus for wireless communication at a device, comprising a processor; memory coupled with the processor; and instructions stored in the memory and executable by the processor to cause the apparatus to perform the method of one or more of Aspects 13-21.

Aspect 28: A device for wireless communication, comprising a memory and one or more processors coupled to the memory, the one or more processors configured to perform the method of one or more of Aspects 13-21.

Aspect 29: An apparatus for wireless communication, comprising at least one means for performing the method of one or more of Aspects 13-21.

Aspect 30: A non-transitory computer-readable medium storing code for wireless communication, the code comprising instructions executable by a processor to perform the method of one or more of Aspects 13-21.

Aspect 31: A non-transitory computer-readable medium storing a set of instructions for wireless communication, the set of instructions comprising one or more instructions that, when executed by one or more processors of a device, cause the device to perform the method of one or more of Aspects 13-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to:
      receive, in association with a first subscription of the UE, an indication of a high priority identifier to be used for paging messages associated with the first subscription, wherein the high priority identifier and a second identifier allocated to the UE for paging are associated with a same set of paging occasions;
      tune away from a network connection associated with a second subscription of the UE;
      monitor one or more paging occasions of the set of paging occasions associated with the high priority identifier and the second identifier after tuning away from the network connection associated with the second subscription; and
      determine, using the high priority identifier, whether a high priority paging message is present for the UE based at least in part on monitoring the one or more paging occasions.

2. The UE of claim 1, wherein the UE is a multi-subscriber identity module UE that includes at least a first SIM for the first subscription and a second SIM for the second subscription.

3. The UE of claim 1, wherein the one or more processors are further configured to:
   transmit a request for the high priority identifier during a registration procedure, wherein the high priority identifier is received based at least in part on transmitting the request.

4. The UE of claim 1, wherein, to determine whether the high priority paging message is present for the UE, the one or more processors are configured to:
   receive downlink control information (DCI) that includes a short message;
   determine that the short message includes an indication of a high priority paging message;
   decode a physical downlink shared channel (PDSCH) communication scheduled by the DCI based at least in part on determining that the short message includes the indication of the high priority paging message; and
   determine that a paging record in the PDSCH communication satisfies a condition associated with the high priority identifier.

5. The UE of claim 4, wherein the condition is that the paging record includes a UE identifier that matches the high priority identifier.

6. The UE of claim 4, wherein a single bit of the short message indicates whether the high priority paging message is present in the paging record.

7. The UE of claim 1, wherein the one or more processors are further configured to:
   respond to the high priority paging message based at least in part on a determination that the high priority paging message is present for the UE.

8. The UE of claim 1, wherein the one or more processors are further configured to:
   suspend the network connection associated with the second subscription; and
   establish a network connection associated with the first subscription based at least in part on a determination that the high priority paging message is present for the UE.

9. The UE of claim 1, wherein, to determine whether the high priority paging message is present for the UE, the one or more processors are configured to:
   determine that a short message, included in downlink control information (DCI), includes an indication that the high priority paging message is not present in a paging record included in a physical downlink shared channel communication scheduled by the DCI; or
   determine that the paging record does not include a UE identifier that matches the high priority identifier.

10. The UE of claim 1, wherein the one or more processors are further configured to:
    ignore one or more paging messages based at least in part on a determination that the high priority paging message is not present for the UE.

11. The UE of claim 1, wherein the high priority identifier and the second identifier include a same set of bits used to calculate a UE identifier of the UE for paging.

12. The UE of claim 1, wherein the high priority identifier includes a same number of bits as the second identifier and is unique for the UE within a tracking area.

13. A network node for wireless communication, comprising:
    a memory; and
    one or more processors coupled to the memory, the one or more processors configured to:
       transmit, in association with a first subscription of a user equipment (UE), an indication of a high priority identifier to be used for paging messages associated with the first subscription, wherein the high priority identifier and a second identifier allocated to the UE for paging are associated with a same set of paging occasions; and
       transmit, in one or more paging occasions of the set of paging occasions associated with the high priority identifier and the second identifier, an indication of whether a high priority paging message is present for the UE, wherein the indication is based at least in part on the high priority identifier.

14. The network node of claim 13, wherein, to transmit the indication of whether the high priority paging message is present for the UE, the one or more processors are configured to:
  transmit downlink control information (DCI) that includes a short message, wherein the short message includes an indication of a high priority paging message; and
  transmit a physical downlink shared channel (PDSCH) communication scheduled by the DCI, wherein a paging record in the PDSCH communication satisfies a condition associated with the high priority identifier.

15. The network node of claim 14, wherein the condition is that the paging record includes a UE identifier that matches the high priority identifier.

16. The network node of claim 14, wherein a single bit of the short message indicates whether the high priority paging message is present in the paging record.

17. The network node of claim 13, wherein, to transmit the indication of whether the high priority paging message is present for the UE, the one or more processors are configured to:
  transmit a short message, included in downlink control information (DCI), that includes an indication that the high priority paging message is not present in a paging record included in a physical downlink shared channel communication scheduled by the DCI; or
  transmit the paging record, wherein the paging record does not include a UE identifier that matches the high priority identifier.

18. A method of wireless communication performed by a network node, comprising:
  transmitting, in association with a first subscription of a user equipment (UE), an indication of a high priority identifier to be used for paging messages associated with the first subscription, wherein the high priority identifier and a second identifier allocated to the UE for paging are associated with a same set of paging occasions; and
  transmitting, in one or more paging occasions of the set of paging occasions associated with the high priority identifier and the second identifier, an indication of whether a high priority paging message is present for the UE, wherein the indication is based at least in part on the high priority identifier.

19. A method of wireless communication performed by a user equipment (UE), comprising:
  receiving, in association with a first subscription of the UE, an indication of a high priority identifier to be used for paging messages associated with the first subscription, wherein the high priority identifier and a second identifier allocated to the UE for paging are associated with a same set of paging occasions;
  tuning away from a network connection associated with a second subscription of the UE;
  monitoring one or more paging occasions of the set of paging occasions associated with the high priority identifier and the second identifier after tuning away from the network connection associated with the second subscription; and
  determining, using the high priority identifier, whether a high priority paging message is present for the UE based at least in part on monitoring the one or more paging occasions.

20. The method of claim 19, wherein the UE is a multi-subscriber identity module UE that includes at least a first SIM for the first subscription and a second SIM for the second subscription.

21. The method of claim 19, further comprising:
  transmitting a request for the high priority identifier during a registration procedure, wherein the high priority identifier is received based at least in part on transmitting the request.

22. The method of claim 19, wherein determining whether the high priority paging message is present for the UE comprises:
  receiving downlink control information (DCI) that includes a short message;
  determining that the short message includes an indication of a high priority paging message;
  decoding a physical downlink shared channel (PDSCH) communication scheduled by the DCI based at least in part on determining that the short message includes the indication of the high priority paging message; and
  determining that a paging record in the PDSCH communication satisfies a condition associated with the high priority identifier.

23. The method of claim 22, wherein the condition is that the paging record includes a UE identifier that matches the high priority identifier.

24. The method of claim 22, wherein a single bit of the short message indicates whether the high priority paging message is present in the paging record.

25. The method of claim 19, further comprising:
  responding to the high priority paging message based at least in part on a determination that the high priority paging message is present for the UE.

26. The method of claim 19, further comprising:
  suspending the network connection associated with the second subscription; and
  establishing a network connection associated with the first subscription based at least in part on a determination that the high priority paging message is present for the UE.

27. The method of claim 19, wherein determining whether the high priority paging message is present for the UE comprises:
  determining that a short message, included in downlink control information (DCI) includes an indication that the high priority paging message is not present in a paging record included in a physical downlink shared channel communication scheduled by the DCI; or
  determining that the paging record does not include a UE identifier that matches the high priority identifier.

28. The method of claim 19, further comprising:
  ignoring one or more paging messages based at least in part on a determination that the high priority paging message is not present for the UE.

29. The method of claim 19, wherein the high priority identifier and the second identifier include a same set of bits used to calculate a UE identifier of the UE for paging.

30. The method of claim 19, wherein the high priority identifier includes a same number of bits as the second identifier and is unique for the UE within a tracking area.

* * * * *